United States Patent [19]

Hicks, Jr.

[11] Patent Number: 4,768,849
[45] Date of Patent: Sep. 6, 1988

[54] FILTER TAP FOR OPTICAL COMMUNICATIONS SYSTEMS

[76] Inventor: John W. Hicks, Jr., 312 Howard St., Northboro, Mass. 01532

[21] Appl. No.: 907,662

[22] Filed: Sep. 15, 1986

[51] Int. Cl.$^4$ .......................... G02B 6/26; G02B 6/02; H01S 3/30; H01S 3/08
[52] U.S. Cl. .............................. 350/96.15; 350/96.29; 350/96.16; 372/3; 372/92
[58] Field of Search ............... 350/96.15, 96.16, 96.10, 350/96.30, 96.29; 356/352; 372/3, 6, 92, 96, 99

[56] References Cited

U.S. PATENT DOCUMENTS

| | | | |
|---|---|---|---|
| 4,315,666 | 2/1982 | Hicks, Jr. | 350/96.15 |
| 4,317,614 | 3/1982 | Palmer | 350/96.19 X |
| 4,342,499 | 8/1982 | Hicks, Jr. | 350/96.15 |
| 4,515,431 | 5/1985 | Shaw et al. | 350/96.15 X |
| 4,546,476 | 10/1985 | Shaw et al. | 350/96.15 |
| 4,557,552 | 12/1985 | Newton et al. | 350/96.19 |
| 4,577,924 | 3/1986 | Mathis | 350/96.15 |
| 4,592,043 | 5/1986 | Williams | 350/96.15 |
| 4,676,583 | 6/1987 | Hicks, Jr. | 350/96.15 |
| 4,720,160 | 1/1988 | Hicks, Jr. | 350/96.30 X |

FOREIGN PATENT DOCUMENTS

83/02168 6/1983 PCT Int'l Appl.
85/00484 1/1985 PCT Int'l Appl.

OTHER PUBLICATIONS

Luc B. Jeunhomme, *Single-Mode Fiber Optics*, Marcel Dekker, Inc., 1983, pp. 180–184.

Primary Examiner—William L. Sikes
Assistant Examiner—Akm E. Ullah
Attorney, Agent, or Firm—Wolf, Greenfield & Sacks

[57] ABSTRACT

A filter tap for optical communication systems includes an optical resonant cavity comprising generally parallel, facing dielectric mirrors spaced to permit resonance in a selected band of channels. Optical signals from an input portion of a main trunk line carrying optical signals on a plurality of bands are coupled to one of the mirrors at an end face of the resonant cavity and are coupled from the one mirror to an output portion of the main trunk line with minimal reduction in optical signals in nonselected bands. Optical signals in the selected band are coupled from the other of the mirrors on the other end face of the resonant cavity to a branch line. In one preferred embodiment, the cavity is a finer optic resonant cavity and trunk line optical fibers are coupled directly to one of the mirrors of the cavity. Power is coupled from the input portion to the output portion of the trunk line by evanescent coupling. A second resonant cavity can couple power in the same or a different band to a second branch line. Optical pumping can be utilized at the filter tap for optical signal amplification. The filter tap can include a macro-optical resonant cavity and lenses for directing optical signals between optical fiber cores and the resonant cavity.

27 Claims, 4 Drawing Sheets

FILTER TAP FOR OPTICAL COMMUNICATIONS SYSTEMS

FIELD OF THE INVENTION

This invention relates to a filter tap for use in optical fiber communication systems and, more particularly, to apparatus for removing or injecting signals in a selected band of channels on an optical fiber communication trunk with minimal perturbation of signals in nonselected bands on the trunk.

BACKGROUND OF THE INVENTION

In recent years, signal transmission systems utilizing optical fibers as the transmission medium have gained increasing popularity due to their wide bandwidth, small size and relative immunity to electrical noise. Such systems include a laser diode or other light source for producing a light beam, means for modulating the light beam, an optical fiber for guiding the light beam between the source and a destination, and a photodetector at the destination. A plurality of modulated channels can be carried on the optical fiber simultaneously to increase its information-carrying capability. The channels can be demultiplexed at a single location or at a number of different locations. For example, a telecommunications system requires taps to a main trunk line at different subscriber locations. Each subscriber may utilize one of the channels being carried on the main trunk. Accordingly, there is a need for devices to remove a selected channel or band of channels from an optical communication line with minimal disturbance to the other channels carried thereon.

Prior art wavelength division multiplexing systems include a multi-transmitter module at one end and a multi-receiver module at the other end. The systems are contemplated for trunks and are not easily adaptable for systems tapped at arbitrary places without first detecting all the signals and then regenerating them. Multiplexing and demultiplexing means typically comprise gratings, prisms or filters. While these devices are adequate for many multiplexing systems, they suffer the drawback that the number of channels that the system may handle is limited because the wavelength dispersion of the demultiplexing device is not adequate to separate very closely-spaced channels in devices of reasonable dimensions. They suffer the additional disadvantage that all channels (or frequencies) are removed at once. They cannot be used conveniently to remove one or a few channels and allow the remainder to continue along the trunk. Moreover, such devices suffer the disadvantage that only a fraction of the channels can be captured in branch fibers due to the small ratio of core diameter to cladding diameter in commercial fibers. When a fix tuned tap is to be used without feedback or continual tuning, it must remove a broad enough portion of the spectrum so that changes in its tuning due, for example, to temperature variations and aging will not shift the removal spectrum or its width by more than a small fraction of the removal spectrum width. Also, some of the multiplexing devices have a relatively high fixed loss per channel. This also limits the possible number of channels.

Various devices and techniques useful in constructing optical couplers and optical filters have been disclosed in the prior art. Lateral coupling structures utilizing optical fibers are disclosed in U.S. Pat. No. 4,315,666 issued Feb. 16, 1982 to Hicks, Jr. Various structures for obtaining close coupling between fiber cores are described. Such lateral couplers work on the principle of coupling of the evanescent waves on two closely-spaced optical cores. The energy on one core gradually is coupled to the other core. Lateral coupling of optical waveguide energy to resonant cavity filters is disclosed in International Publication No. WO83/02168, Hicks, Jr., published June 23, 1983 and International Publication No. WO 85/00484, Williams, published Jan. 31, 1985. The cavity resonators disclosed in these publications are analogous to Fabry-Perot interferometers and comprise a length of optical fiber having mirrors at each end. The length of the optical fiber is chosen to be an integral number of half wavelengths at the selected resonant frequency. The resonator can be linear or in the form of a loop. In the prior art, lateral coupling has been utilized for coupling energy into optical resonant cavity devices. This arrangement has the disadvantage that, to obtain wide bandwidth resonant cavities, for example $10^{10}$ Hertz, lengths on the order of 100 micrometers are required. However, lateral coupling devices require lengths on the order of one centimeter. Thus, lateral coupling to wide band filters has not been possible.

It is an object of the present invention to provide an improved filter tap for optical communication systems.

It is another object of the present invention to provide a filter tap for optical communication systems wherein the main trunk line is optically coupled to the end face of an optical resonant cavity.

It is yet another object of the present invention to provide a filter tap for optical communication systems with minimal disturbance of unselected channels.

SUMMARY OF THE INVENTION

According to the present invention, these and other objects and advantages are achieved in an optical filter tap comprising a main trunk line carrying optical signals on a plurality of bands of channels, an optical resonant cavity comprising generally parallel, facing mirrors spaced to permit resonance at a selected one of the bands of channels, the mirrors having a nonzero transmission characteristic for the selected band, first means for optically coupling the optical signals from an input portion of the main trunk line to one of the mirrors and from the one mirror to an output portion of the main trunk line with minimal reduction in optical signals in nonselected bands, a branch line for carrying optical signals in the selected band to a user, and second means for optically coupling the optical signal in the selected band from the other of the mirrors to the branch line. The mirrors are preferably dielectric mirrors.

In one preferred embodiment, the resonant cavity comprises an optical fiber with the cavity mirrors in contact with opposite end faces thereof, and the input and output portions of the main trunk line comprise optical fibers. The input and output portions of the main trunk line are directly in contact with the one cavity mirror, with the optical fiber core of the input or the output portion axially aligned with the core of the resonant cavity optical fiber.

The input and output portions of the main trunk line are coupled by evanescent coupling between optical fibers. It is preferred that the means for evanescent coupling between input and output portions comprise means for maintaining the optical fibers of the input and output portions in closely-spaced parallel alignment over a length L and that the length L be selected such that, at the surface of the one mirror of the resonant cavity, about half of the optical signal on the input portion has been transferred by evanescent coupling to the output portion.

In another preferred embodiment, the filter tap further includes means for optical pumping of at least a section of the main trunk line to amplify the optical signals carried thereon. The optical pumping means can include a section of the main trunk line doped with neodymium or erbium and a laser diode optical pumping source.

In another embodiment, the first coupling means includes a first lens means for imaging the end of the input portion optical fiber on the one mirror in alignment with the resonant cavity optical fiber and a second lens means for imaging the mirror on the core of the output portion optical fiber such that optical signals are reflected and imaged from the input portion to the output portion of the main trunk line.

In another embodiment, the filter tap further includes a second resonant cavity including an optical fiber coupled at one end to the same mirror as the main trunk line so that optical signals on the main trunk line are coupled to both resonant cavities. The other end of the second resonant cavity is coupled to a second branch line. The second resonant cavity can be resonant at the same or a different wavelength as the first cavity. The two branch lines can be combined on a single branch line with a phase shifter and a lateral coupler.

In still another embodiment, the resonant cavity comprises spaced-apart macro-optical dielectric mirrors and the first coupling means comprises a first lens means for directing optical signals from the input portion of the main trunk line to one of the mirrors and for directing reflected optical signals from the one mirror to the output portion of the main trunk line. The mirror can be in the form of a coating on the lens means. One of the mirrors can include a step so that the cavity has two resonant wavelengths. The filter tap can include a third mirror spaced from the other mirrors such that optical signals in the selected band of channels are reflected through the resonant cavity and are directed by the first lens means to the branch line positioned on the same end of the resonant cavity as the main trunk line.

BRIEF DESCRIPTION OF THE DRAWINGS

For a better understanding of the present invention, together with other and further objects, advantages and capabilities thereof, reference is made to the accompanying drawings which are incorporated herein by reference, and in which.

DETAILED DESCRIPTION OF THE INVENTION

Figure 1A:
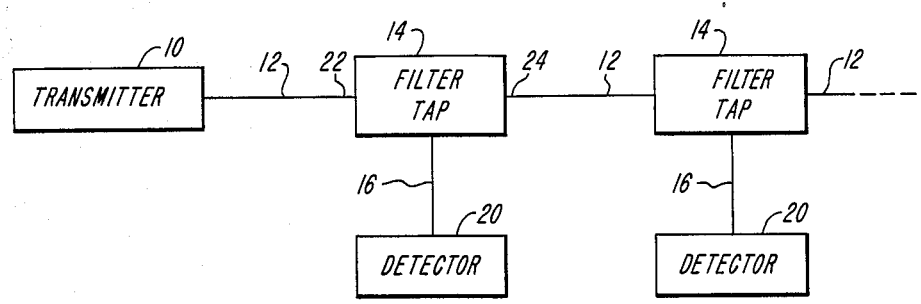
FIGS. 1A and 1B are schematic block diagrams of systems which utilize an optical filter tap in accordance with the present invention.

A typical optical communication system is shown in block diagram form in FIG. 1A. A transmitter 10 provides a modulated light beam on a main trunk line 12 which is preferably a single mode silica optical fiber of conventional construction. The transmitted light signal is typically in the wavelength range of 0.8–0.9 microns, 1.05 microns, 1.3 microns or 1.5–1.7 microns. The transmitted signals may, for example, lie in 100 bands, each of a $10^{10}$ Hertz bandwidth in a $10^{12}$ Hertz total signal spectrum. Spaced at various points along the main trunk line 12 are filter taps 14 in accordance with the present invention. Each filter tap 14 removes a selected band of channels from the main trunk line 12 and directs the selected band to a branch line 16. The branch line 16 is an optical fiber which typically connects to a photodetector 20 which converts the optical signal into an electrical signal.

General requirements of the filter tap 14 are that it remove the selected band of channels from the main trunk line 12 with minimal perturbation of the remaining bands as to amplitude or phase. It can be seen in FIG. 1A that for each filter tap 14 there is an input portion 22 and an output portion 24 of the main trunk line 12.

Figure 1B:
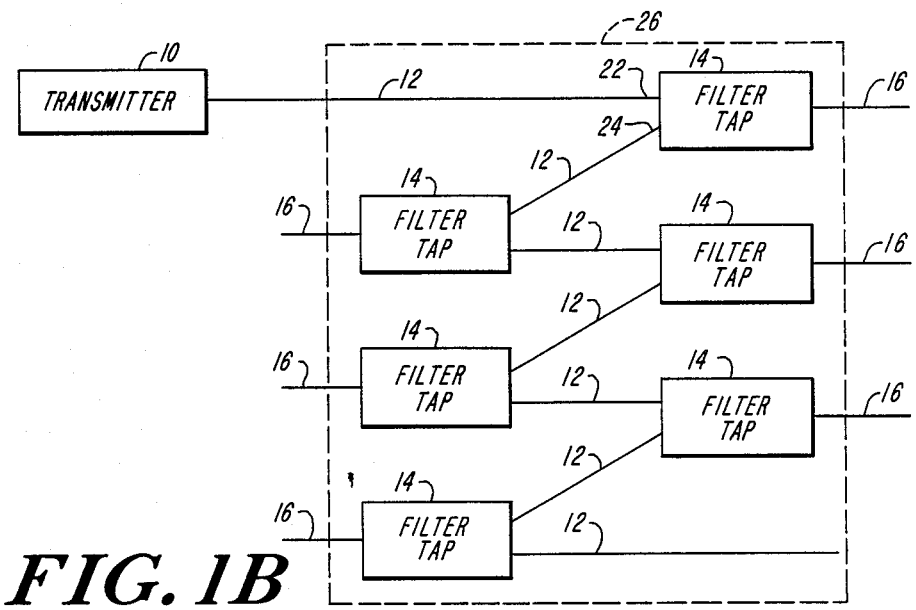

A block diagram of an alternative system configuration is shown in FIG. 1B. The transmitter 10 provides a modulated light beam on the main trunk line 12 to a hub or node 26 which removes several or all of the bands from the trunk line. A plurality of filter taps 14, each resonant at a different band, are placed at the same location on the trunk line. A different band of channels is directed to each of the branch lines 16. The node 26 can be manufactured as an integrated unit containing each of the filter taps 14. For each filter tap 14, there is an input portion 22 and an output portion 24 of the main trunk line 12.

Figure 2A:
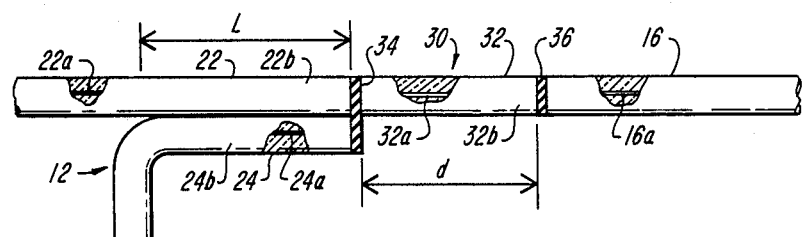
FIG. 2A is a schematic diagram of an optical filter tap in accordance with the present invention.

A filter tap in accordance with the present invention is illustrated in schematic form in FIG. 2A. A resonant optical cavity 30 includes an optical fiber 32 of specified length having dielectric mirrors 34 and 36 coupled to opposite ends of optical fiber 32. The input portion 22 and the output portion 24 of main trunk line 12 are both coupled directly to mirror 34 at one end face of the resonant cavity 30. The optical fibers 22, 24 and 32 include cores 22a, 24a and 32a, respectively, and cladding 22b, 24b and 32b, respectively. The optical fibers of input and output portions 22, 24 are coupled to the mirror 34 such that the core 32a of fiber 32 is axially aligned either with the core 22a or with the core 24a. The branch line 16 is directly coupled to the mirror 36 at the opposite end of the resonant cavity 30 from the main trunk line 12. A core 16a of branch line 16 is axially aligned with core 32a of fiber 32.

The resonant cavity 30 is a Fabry-Perot type interferometer resonant cavity. The optical path length between mirrors 34 and 36 is equal to an integral number of half wavelengths at the selected resonant frequency. Thus, as known in the art, the reflected waves interfere constructively with input waves and produce resonance. Such devices have resonant frequencies at each frequency where the length of the cavity equals an integral number of half wavelengths. For the typical wavelength and bandwidth described above, the resonant cavity 30 has a length d on the order of 100 microns.

As noted above, lateral coupling to resonant cavities with lengths on the order of 100 microns is impractical. Coupling to the resonant cavity 30 through one of the end face mirrors had been thought impractical due to the losses characteristic of mirrors. However, it has been found that dielectric mirrors can be fabricated with efficiencies on the order of 99%. As known in the art, dielectric mirrors comprise layers on a glass substrate alternating between high and low indices of refraction. A suitable dielectric mirror for the present invention reflects typically 90% to 99% of the incident power over the spectrum of interest and transmits most of the non-reflected power. Accordingly, when an optical signal having a number of bands is present on the main trunk line 12, 90% to 99% of the signal is reflected by the mirror 34. Due to the characteristics of the resonant cavity 30, the energy at the resonant wavelength band is transmitted through the cavity 30 onto branch line 16.

Figure 2B:
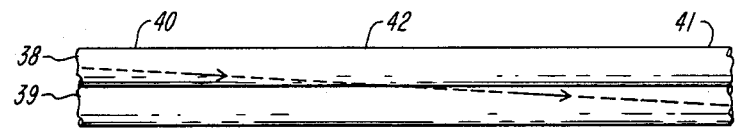
FIGS. 2B and 2C are schematic diagrams illustrating the lateral coupler used in the filter tap of FIG. 1.
Figure 2C:
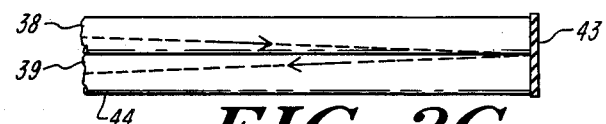

It will be understood that the disclosed device will not be useful if the input optical signal is reflected back to the source by the mirror 34. The present invention utilizes a 50% lateral coupler in combination with the mirror 34 to couple all of the light beam except the selected wavelength band from the input portion 22 of the main trunk 12 to the output portion 24 of the main trunk 12. The operation of the 50% lateral coupler will be described with reference to FIGS. 2B and 2C. A conventional lateral coupler wherein light energy is coupled from a first optical fiber 38 to a second optical fiber 39 by evanescent coupling is illustrated in FIG. 2B. In evanescent coupling, a light beam entirely on fiber 38 at point 40 is gradually coupled to fiber 39 over a typical distance on the order of one centimeter until at point 41 the beam is entirely on fiber 39. At an intermediate point 42, 50% of the light beam is present on each of the optical fibers 38 and 39. Now, assume that the fibers 38 and 39 are cut at the point 42 and a mirror 43 is attached to the end faces of fibers 38 and 39 at that point. The input energy, traveling 50% on each of the fibers 38 and 39, is reflected by the mirror 43 and continues to be evanescently coupled from fiber 38 to 39 until at point 44, 100% of the light energy is on fiber 39. The use of the mirror 43 accomplishes a folding of the lateral coupler.

Referring again to FIG. 2A, the length L of the lateral coupler is selected so that 100% of the input light energy, less any losses, is transferred by the coupler from the input portion 22 to the output portion 24 of the main trunk line 12. Lateral couplers typically include closely-spaced parallel fiber optic cores. Such devices are described in detail in U.S. Pat. No. 4,315,666, which is incorporated herein by reference. It will be understood that the region of lateral coupling between input portion 22 and output portion 24 is not necessarily at the mirror 34 but can be separated therefrom by any desired distance. However, the two optical path lengths extending from the coupling region to the mirrors must be either equal or differ by an integral number of half wavelengths so that the returning light beams have the proper phase relation to complete transferring all the power from the incoming trunk line to the outgoing trunk line.

In operation, a number of optical channels are supplied from transmitter 10 along the input portion 22 of the main trunk 12. A selected band of these channels is removed from the main trunk line 12 by operation of resonant cavity 30 and is directed onto branch line 16. The remaining nonselected channels are reflected by mirror 34, and by operation of the lateral coupler over the length L, are transferred to output portion 24 of main trunk line 12. The present invention can also operate in a reverse direction wherein a selected band of channels is inserted onto the main trunk line 12 from the branch line 16. The resonant cavity 30 transmits signals near the resonant wavelength in either direction.

Figure 3A:
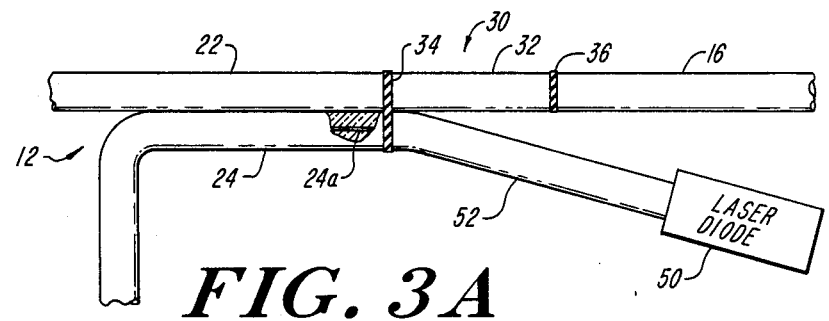
FIGS. 3A and 3B schematically illustrate optical filter taps in accordance with the present invention which utilize optical pumping.

The optical filter tap of the present invention, while highly efficient, does not transmit 100% of the optical signals in unselected channels. When a large number of filter taps are to be placed on a main trunk line, a substantial attenuation will occur and it is sometimes desirable to provide a simple means for amplifying the signals at one or more of the filter taps. The arrangement shown in FIG. 3A utilizes optical pumping to provide optical amplification of the signals on the main trunk line. Laser diode 50 operating at an appropriate optical pumping wavelength is coupled by means of an optical fiber 52 to the dielectric mirror 34. The fiber 52 is preferably coupled to the mirror 34 with its core axially aligned with the optical fiber core 24a of the output portion 24 of main trunk line 12.

In one embodiment, a section of the output portion 24 at or near the couple is doped with neodymium or erbium. With such doping, optical pump power in the region around 0.8 microns produces optical amplification of the signal at 1.3 microns in accordance with known optical pumping techniques. To accomplish such pumping with the arrangement shown in FIG. 3A, the dielectric mirror 34 must be designed such that it is transmissive at the optical pump wavelength and reflective at the optical signal wavelength so that the optical pump energy is transmitted through the mirror 34 into the main trunk line 12, while the optical signal is reflected from the mirror 34.

Figure 3B:
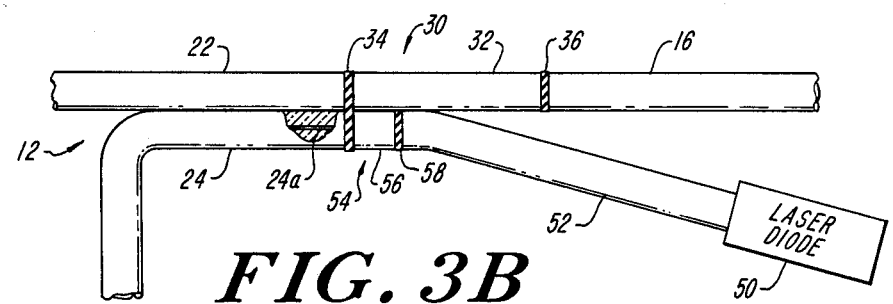

An alternative approach to coupling optical pumping power into the main trunk line without requiring a specially-designed mirror 34 is shown in FIG. 3B. The optical pumping power, instead of being coupled directly from optical fiber 52 to mirror 34, is coupled to an end face of a resonant cavity 54. The resonant cavity 54 comprises a length of optical fiber 56 coupled at one end to the mirror 34 and coupled at the other end to a dielectric mirror 58. The resonant cavity 54 is similar in general construction to the resonant cavity 30 and is resonant at the optical pumping wavelength. The core of the optical fiber 56 is axially aligned at one end with the optical fiber core 24a of output portion 24 of the main trunk line 12 and is axially aligned at the other end with the core of optical fiber 52. Optical fiber 52 is attached to the mirror 58 such that optical pumping power from the laser diode 50 is coupled through the resonant cavity 54 into the main trunk line 12 and causes optical amplification of the signals on the main trunk line. While the optical pumping has been described above in terms of a neodymium or erbium doped fiber, it will be understood that Raman or Brillouin optical pumping, or other forms of pump power, can be utilized for optical amplification.

Figure 4:
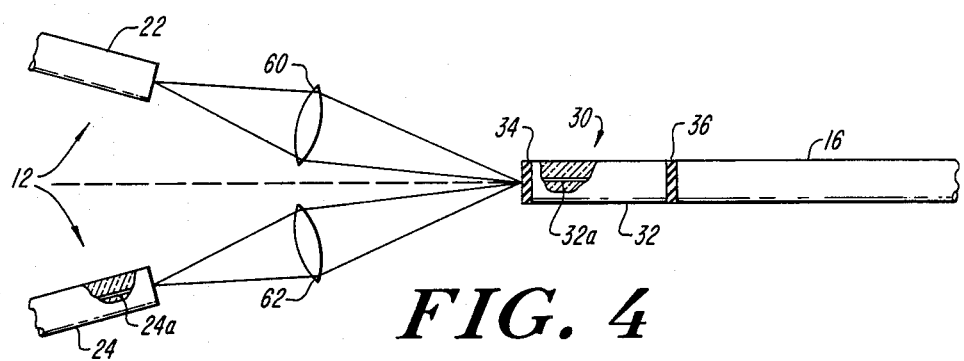
FIG. 4 schematically illustrates an embodiment of the invention utilizing a lens to image the fiber optic core on the end of the resonant cavity.

Another embodiment of the present invention is shown in FIG. 4. Optical signals on the input portion 22 of the main trunk line 12 are imaged by a lens 60 onto the mirror 34 of resonant cavity 30. The image is aligned with the core 32a of optical fiber 32. The optical signals reflected from the mirror 34 are imaged by a lens 62 on the optical fiber core 24a of the output portion 24 of the main trunk line. The incident and reflected signals are at least partially within the angle of acceptance of the core 32a of the resonant cavity optical fiber 32. The selected band of channels at the resonant wavelength band of the cavity 30 is passed through the mirror 36 onto branch line 16. It will be understood that a lens can also be utilized to image the output of the resonant cavity 30 on the core of the branch line 16 optical fiber. The nonselected bands on the main trunk line 12 are reflected to the output portion 24 and continue on the main trunk line 12. The operation of the embodiment of FIG. 4 is in general the same as that of FIG. 2A except that lateral coupling between optical fibers is not utilized and input and output portions 22, 24 are not coupled directly to the mirror 34.

Figure 5A:
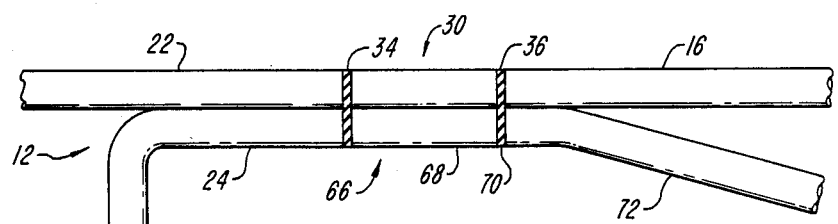
FIGS. 5A and 5B schematically illustrate optical filter taps in accordance with the present invention utilizing two resonant cavities.

Another preferred embodiment of the present invention is shown in FIG. 5A. This embodiment utilizes input portion 22 and output portion 24 of main trunk line 12 coupled to the mirror 34 of resonant cavity 30 and branch line 16 coupled to mirror 36 of the resonant cavity 30 as shown in FIG. 2A and described hereinabove. In addition, a second resonant cavity 66 comprises an optical fiber 68 coupled at one end to the mirror 34 and at the other end to a dielectric mirror 70. A second branch line 72 includes an optical fiber coupled to the end face of mirror 70. The core of resonant cavity optical fiber 68 is axially aligned through mirror 34 with optical fiber core 24a of output portion 24 and is axially aligned through mirror 70 with the optical fiber core of branch line 72. The resonant cavity 66 operates the same as described hereinabove for resonant cavity 30.

The resonant wavelengths of the cavities 30 and 66 can be made the same or different. When the resonant wavelengths of the cavities 30, 66 are different, separate bands of channels are removed from the main trunk line 12 and are separately directed to branch lines 16 and 72. When the resonant wavelengths of the cavities 30, 66 are the same, then approximately 50% of the total power in the selected wavelength band is removed from the main trunk line 12 by each resonant cavity 30, 66 and is directed to the branch lines 16, 72, respectively. The division of 50% of the power to each of the resonant cavities 30, 66 is apparent from the fact that the mirror 34 is located at the 50% point on the lateral coupler, as described hereinabove.

Figure 5B:
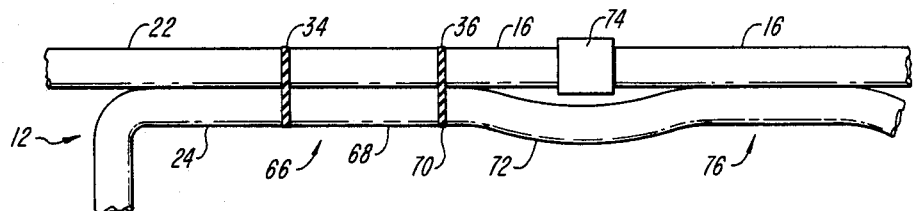

The signals on branch lines 16 and 72 can be combined onto a single branch line with the arrangement shown in FIG. 5B. The embodiment of FIG. 5B is the same as that of FIG. 5A except that a phase shifter 74 is placed in the branch line 16 and the branch line 72 is laterally coupled to the branch line 16 downstream of the phase shifter 74, in the region 76. The purpose of this arrangement is to combine the signals on branch lines 16 and 72 onto branch line 16 by lateral coupling of the energy from branch line 72 in region 76. The phase shifter 74 ensures that the signals on the two branch lines are combined in phase. It will be understood that the phase shifter 74 can be placed in either of the branch lines 16, 72. With the apparatus of FIG. 5B, it is possible to obtain nearly 100% of the energy in the selected band on the branch line 16.

A variation of the embodiment of FIG. 5B is to slightly offset the resonant wavelengths of the two resonant cavities 30, 66 to obtain a total response curve with a flatter top than is obtainable with a single resonant cavity. To obtain such a response, the resonant frequencies of the cavities 30 and 66 are typically separated such that the higher frequency 50% power point of one cavity coincides with the lower frequency 50% power point of the other cavity. It will be understood that when the cavities 30 and 66 are resonant at the same frequency, the mirrors 36 and 70 can be constructed as a single integral unit since the spacing is the same for each cavity.

In the embodiments of FIGS. 2A, 3A, 3B, 5A and 5B, the resPective resonant cavities can be made by cutting a section of desired length from the optical fiber, attaching mirrors to each end of the removed section and then attaching the resonant cavity mirrors to the optical fiber. This technique insures optimum matching of fiber characteristics. In addition, when the resonant cavity or cavities are to be located at a region of lateral coupling between optical fibers, the cavity or cavities can be made by cutting a section from the coupled optical fibers, forming mirrors to each end and then attaching the resonant cavity mirrors to the optical fibers.

Figure 6A:
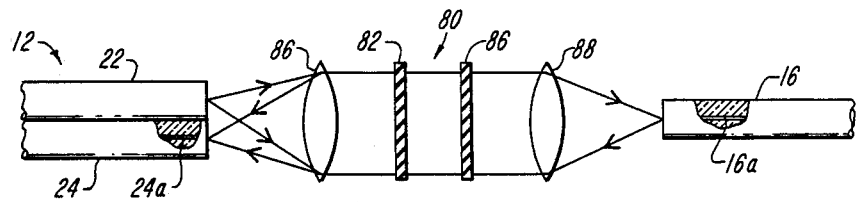
FIGS. 6A–6D illustrate embodiments of the present invention utilizing macro-optical resonant cavities.

An embodiment of the present invention utilizing a macro-optical resonant cavity is shown in FIG. 6A. "Macro-optical resonant cavity" is used to describe a resonant cavity defined by two parallel mirrors which are separated by air or dielectric material. The mirrors are relatively larger in dimension than in the case where an optical fiber forms the path between the two mirrors In FIG. 6A, a resonant cavity 80 is defined by parallel dielectric mirrors 82 and 84 separated by an air space. The space between mirrors 82 and 84 is equal to an integral number of half wavelengths at the resonant wavelength. Optical signals on the input portion 22 of main trunk line 12 are collimated by a lens 86 and are directed to the mirror 82 at the end face of the cavity 80. Nearly 100% of the energy in the unselected bands is reflected by the mirror 82 back through the lens 86 and is focused by the lens 86 on the core 24a of output portion 24 of main trunk line 12. The resonant cavity 80 is tilted by a small angle so that the reflected energy reaches the core 24a. The signals in the selected resonant wavelength band of the cavity 80 are passed by the cavity through the mirror 86 and are focused by a lens 88 on optical fiber core 16a of branch line 16. Thus, the selected band is directed to the branch line 16 while unselected bands remain on the main trunk line 12.

Figure 6B:
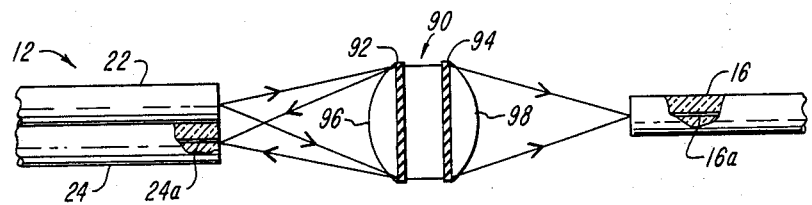

A variation of the above-described embodiment is shown in FIG. 6B. A resonant cavity 90 is formed by dielectric mirrors 92, 94 integrally formed on planar surfaces of lenses 96, 98, respectively, or on plane surfaces attached to the lenses. Operation of this embodiment is the same as described above in connection with FIG. 6A. Optical signals on input portion 22 of main trunk line 12 are directed through lens 96 and are collimated by lens 96. Unselected channels are reflected by mirror 92 to optical fiber core 24a of output portion 24. The selected band resonates in cavity 90, passes through mirror 94, and is focused by lens 98 on optical fiber core 16a of branch line 16. The embodiment of FIG. 6B provides simplified manufacturing and ease of tuning of the resonant cavity 90.

Figure 6C:
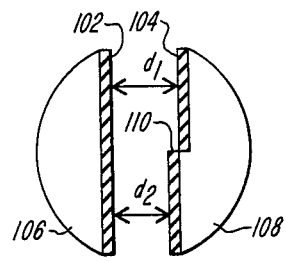

Occasionally, it is desired to tailor the response of the resonant cavity 80 or 90 to more closely match the desired square shape of the removal band of frequencies while rejecting unselected channels. The response can be broadened by making the surfaces of mirrors 92, 94 slightly out of parallel. This has the effect of a variable path length between mirror surfaces and a broadening of the response, rather than one well-defined resonant frequency. An alternative approach is shown in FIG. 6C wherein only the resonant cavity portion of the filter tap is shown. The cavity includes dielectric mirrors 102 and 104 integrally formed on inside surfaces of lenses 106, 108, respectively, or on plane surfaces attached to the lenses. The mirror 104 includes a step 110 such that part of the mirror 104 is in one plane while another portion is in a slightly displaced parallel plane. As a result, a portion of resonant cavity has a spacing $d_1$ and another portion of resonant cavity has a spacing $d_2$. This produces two resonant frequencies and can be thought of as two side-by-side resonant cavities. The two resonant frequencies are preferably spaced to produce a relatively flat topped response. The step is on the order of 1/100 of the optical wavelength.

Figure 6D:
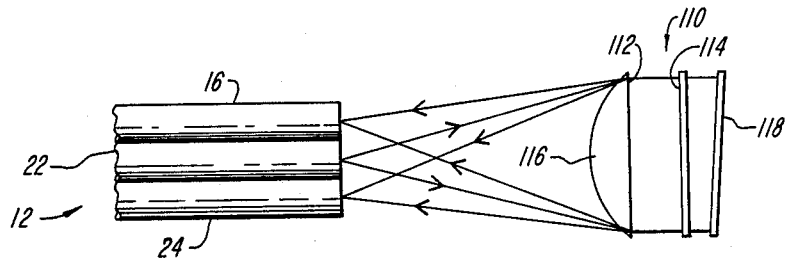

A further embodiment of the present invention is illustrated in FIG. 6D. This embodiment differs from the embodiment of 6B in that the branch line 16 is located on the same side of the resonant cavity as the main trunk line 12 and signals in the selected resonant wavelength band make two passes through the resonant cavity. A resonant cavity 110 is defined by a dielectric mirror 112 formed on the inner surface of a lens 116, and by a mirror 114. The resonant cavity 110 further includes a dielectric mirror 118 slightly tilted with respect to the mirror 114. Nonselected bands on the input portion 22 of the main trunk line 12 are reflected by the mirror 112 on the end face of the resonant cavity 110 and are focused by the lens 116 on the output portion 24 of the main trunk line 12. Optical signals in the selected band of wavelengths of the resonant cavity 110 pass through the mirror 112 and the mirror 114 and are incident upon mirror 118. The selected band of wavelengths is reflected by mirror 118 through the resonant cavity 110 and, due to the slight tilting of the mirror 118, is focused by the lens 116 on the branch line 16. The embodiment of FIG. 6D has the advantage that the selected channel passes through the resonant cavity twice thereby obtaining a frequency response with greater discrimination against out-of-band signals and with much less power in its tails. Although the branch line 16 is shown in FIG. 6D in the same plane as the input portion 22 and the output portion 24, it will be understood that the branch line 16 is located so that the light undergoing the first pass and the light undergoing the second pass through the resonant cavity have substantially equal angles relative to the axis of the cavity.

With regard to FIG. 6D, it is noted that in calculating the step and frequency offset, the light is not filtered once and then mixed, then filtered again. The light which is filtered by one side of the cavity is filtered again by the same side. The light going through the other side is also filtered twice. Then the power from the two sides is mixed in the branch line. This produces a somewhat narrower flat topped spectral pass line than can be achieved if there were mixing for the second stage of filtering.

While there has been shown and described what is at present considered the preferred embodiments of the present invention, it will be obvious to those skilled in the art the various changes and modifications may be made therein without departing from the scope of the invention as defined by the appended claims.

What is claimed is:

1. An optical filter tap comprising:
a main trunk line carrying optical signals on a plurality of bands of channels and having an input portion directing said signals to said filter tap and an output portion directing said signals away from said filter tap;
an optical resonant cavity comprising first and second mirrors spaced to permit resonance at a selected one of said bands of channels, said first and second mirrors having a nonzero transmission characteristic for said selected band;
first coupling means for optically coupling the optical signal from said input portion of the main trunk line to said first mirror and from said first mirror to said output portion with minimal reduction in optical signals in nonselected bands;
a branch line for carrying optical signals in said selected band to a user; and
second coupling means for optically coupling the optical signal in said selected band from said second mirror to said branch line.

2. An optical filter tap as defined in claim 1 wherein said mirrors comprise dielectric mirrors.

3. An optical filter tap as defined in claim 2 wherein said resonant cavity comprises an optical fiber with said mirrors connected to opposite end faces thereof.

4. An optical filter tap as defined in claim 3 wherein the input and output portions of said main trunk line each comprise an optical fiber having a core and wherein said first coupling means includes means for connecting said input and output portions of said main trunk line directly to said first mirror with the core of one of said input and said output portions axially aligned with the core of said resonant cavity optical fiber, and means for evanescent coupling between said input and output portions.

5. An optical filter tap as defined in claim 4 wherein said branch line comprises an optical fiber having a core and wherein said second coupling means includes means for connecting the branch line optical fiber directly to said second mirror with the core of the branch line optical fiber axially aligned with the core of the resonant cavity optical fiber.

6. An optical filter tap as defined in claim 3 wherein the input and output portions of said main trunk line each comprise an optical fiber and wherein said first coupling means includes a first lens means for imaging the core of the input portion optical fiber on said first mirror in alignment with the core of the resonant/cavity optical fiber and a second lens means for imaging said first mirror on the core of the output portion optical fiber such that optical signals are reflected and imaged from the input portion to the output portion of the main trunk line.

7. An optical filter tap as defined in claim 4 further including means for optical pumping of at least a section of the main trunk line to amplify the optical signals carried thereon.

8. An optical filter tap as defined in claim 7 wherein the optical pumping means includes said section of the main trunk line having a neodymium or erbium doped core.

9. An optical filter tap as defined in claim 7 wherein said means for optical pumping includes a laser diode optical pumping source optically coupled to the main trunk line through said first mirror by an optical fiber connected between said laser diode pumping source and said first mirror and positioned in axial alignment with the optical fiber of said input portion or said output portion.

10. An optical filter tap as defined in claim 9 wherein said means for optical pumping further includes a fiber optic resonant cavity positioned between said laser diode pumping source and said one mirror to facilitate transmission of pumping energy to said main trunk line.

11. An optical filter tap as defined in claim 9 wherein said first mirror has a relatively high transmission at an output wavelength of said laser diode pumping source to facilitate transmission of pumping energy to said main trunk line.

12. An optical filter tap as defined in claim 4 wherein said means for evanescent coupling comprises means for maintaining the optical fibers of said input and output portions in closely-spaced, parallel alignment over a length L selected to permit coupling of substantially all of the optical signals in nonselected bands to the output portion.

13. An optical filter tap as defined in claim 12 wherein the length L is selected such that, at the surface of said one mirror, about half of the optical signal on said input portion has been transferred by evanescent coupling to said output portion.

14. An optical filter tap as defined in claim 4 further including a second resonant cavity comprising an optical fiber coupled at one end to said first mirror in axial alignment with the other of said input and said output portions, the optical fiber of said second resonant cavity having its other end coupled to a third mirror, and further including a second branch line optical fiber coupled to said third mirror in axial alignment with the fiber of the second resonant cavity.

15. An optical filter tap as defined in claim 16 further including a phase shifter in series with one of said branch lines for phase matching the signals on said branch lines and means for combining the phase matched signals on said branch lines onto one of said branch lines.

16. An optical filter tap as defined in claim 2 wherein said resonant cavity comprises spaced-apart, macro-optical dielectric mirrors and said first coupling means includes a first lens means for directing optical signals from said input portion of the main trunk line to one of said mirrors and for directing reflected optical signals from said first mirror to said output portion of the main trunk line.

17. An optical filter tap as defined in claim 20 wherein said second coupling means includes second lens means for directing optical signals on said selected channel to said branch line.

18. An optical filter tap as defined in claim 21 wherein said first mirror comprises a coating on a surface of. said first lens means and wherein said second mirror comprises a coating on a surface of said second lens means.

19. An optical filter tap as defined in claim 20 wherein one of said mirrors includes a step on an inner surface facing the other mirror such that said cavity is resonant at two wavelengths, said step permitting tailoring of the frequency response of said resonant cavity.

20. An optical filter tap as defined in claim 20 further including a third mirror spaced from said second mirror such that optical signals in said selected band are reflected through said resonant cavity and are directed by said first lens means to said branch line positioned on the same end of said resonant cavity as said main trunk line.

21. An optical filter tap as defined in claim 4 wherein said resonant cavity optical fiber comprises a section cut from said main trunk line optical fiber.

22. An optical filter tap for directing an optical signal in a selected band of frequencies from a main trunk to a branch line while blocking optical signals in other than said selected band of frequencies from said branch line, comprising:
an optical resonant cavity comprising a length of optical fiber having mirrors coupled to opposite ends thereof, said cavity being resonant at said selected band of frequencies, said mirrors having a nonzero transmission characteristic in said selected band of frequencies;
first means for optically coupling the power in said main trunk to one of said mirrors with minimal perturbation of the power flow in said main trunk; and
second means for optically coupling the power in said selected band of frequencies passing through the other of said mirrors to said branch line.

23. A fiber optic filter tap comprising;
a fiber optic resonant cavity comprising a length of optical fiber having dielectric mirrors coupled to opposite ends thereof and resonant at a selected band of frequencies;
a pair of main trunk optical fibers optically coupled to one mirror of said resonant cavity and positioned to permit evanescent coupling therebetween over a portion of their lengths, one of said trunk optical fibers acting as an input trunk and the other of said trunk optical fibers acting as an output trunk; and
a branch optical fiber optically coupled to the other mirror of said resonant cavity for supplying the selected band of frequencies to a branch circuit.

24. An optical communication system comprising:
an optical transmitter;
at least one optical filter tap;
a main trunk line carrying optical signals from said transmitter on a plurality of bands of channels and having an input portion directing said signals to said filter tap and an output portion directing said signals away from said filter tap;
at least one branch line for carrying optical signals from said filter tap to a user;
said optical filter tap comprising an optical resonant cavity comprising first and second mirrors spaced to permit resonance at a selected one of said bands of channels, said first and second mirrors having a nonzero transmission characteristic for said selected band;
first means for optically coupling the optical signals from said input portion of the main trunk line to said first mirror and from said first mirror to said output portion with minimal reduction in optical signals in nonselected bands; and
second means for optically coupling the optical signal in said selected band from said second mirror to said branch line.

25. An optical communication system as defined in claim 24 copmrising a plurality of filter taps spaced along said main trunk line, each directing a selected band of channels to respective branch line.

26. An optical communication system as defined in claim 24 comprising a plurality of filter taps at single location on said main trunk line, each directing a selected band of channels to a respective branch line, said plurality of filter taps comprising an integrated optical communication node.

27. An optical filter tap comprising;
an optical resonant cavity comprising first and second mirrors spaced to permit resonance at a selected band of channels, said first and second mirrors having a nonzero transmission characteristic for said selected band;

first coupling means for optically coupling the optical signals from an input portion of a main trunk line carrying optical signals on a plurality of bands of channels to said first mirror at an end face of said resonant cavity and from said first mirror to an output portion of said main trunk line with minimal reduction in optical signals in nonselected bands; and second coupling means for optically coupling the optical signal in said selected band from said second mirror at the other end face of said resonant cavity, to a branch line.

* * * * *